United States Patent
Oakes

(10) Patent No.: US 10,559,958 B2
(45) Date of Patent: Feb. 11, 2020

(54) METHOD, CONTROLLER, AND NETWORK FOR CONTROLLING DEVICES IN POWER DISTRIBUTION NETWORK

(71) Applicant: Upside Energy Ltd., Manchester, England (GB)

(72) Inventor: Graham Oakes, Cheshire (GB)

(73) Assignee: Upside Energy Ltd., Cheshire, England (GB)

( * ) Notice: Subject to any disclaimer, the term of this patent is extended or adjusted under 35 U.S.C. 154(b) by 205 days.

(21) Appl. No.: 15/526,785

(22) PCT Filed: Nov. 12, 2015

(86) PCT No.: PCT/GB2015/053435
§ 371 (c)(1),
(2) Date: May 15, 2017

(87) PCT Pub. No.: WO2016/075470
PCT Pub. Date: May 19, 2016

(65) Prior Publication Data
US 2017/0324248 A1    Nov. 9, 2017

(30) Foreign Application Priority Data
Nov. 13, 2014 (GB) .................................. 1420198.2

(51) Int. Cl.
*H02J 3/14* (2006.01)
*H02J 3/38* (2006.01)
(Continued)

(52) U.S. Cl.
CPC ............... *H02J 3/381* (2013.01); *H02J 3/14* (2013.01); *G06F 1/189* (2013.01); *H02J 3/18* (2013.01)

(58) Field of Classification Search
None
See application file for complete search history.

(56) References Cited

U.S. PATENT DOCUMENTS

| | | | |
|---|---|---|---|
| 2008/0039980 A1* | 2/2008 | Pollack | B60L 53/57 700/295 |
| 2010/0079004 A1* | 4/2010 | Keefe | H02J 3/38 307/80 |

(Continued)

FOREIGN PATENT DOCUMENTS

| | | |
|---|---|---|
| EP | 1801950 A2 | 6/2007 |
| EP | 2708403 A2 | 3/2014 |

(Continued)

OTHER PUBLICATIONS

Australian Application No. 2015344888, Examination Report 1, dated Dec. 21, 2018.

(Continued)

*Primary Examiner* — Jared Fureman
*Assistant Examiner* — Aqeel H Bukhari
(74) *Attorney, Agent, or Firm* — Wood Herron & Evans LLP

(57) ABSTRACT

A method of controlling a plurality of power units in a power distribution network (PDN), comprising: a) receiving one or more requests to increase or decrease the power drawn from, or the power supplied to, the PDN; b) determining, based on aggregated power and/or energy data regarding the plurality of power units, and the one or more requests, one or more parameters defining properties of power units to be controlled in response to the one or more requests; c) receiving status updates from the plurality of power units; d) for each status update, determining whether the properties of the power unit fulfils the determined parameters; and e) if the properties of the power unit fulfils the determined parameters, controlling the power unit to change the amount of power drawn from or supplied to the PDN.

20 Claims, 8 Drawing Sheets

(51) Int. Cl.
*G06F 1/18* (2006.01)
*H02J 3/18* (2006.01)

(56) References Cited

U.S. PATENT DOCUMENTS

| | | | |
|---|---|---|---|
| 2011/0202192 A1* | 8/2011 | Kempton | G06Q 30/0601 |
| | | | 700/291 |
| 2012/0065792 A1 | 3/2012 | Yonezawa et al. | |
| 2013/0015713 A1* | 1/2013 | Hagihara | H02J 3/32 |
| | | | 307/72 |
| 2013/0289772 A1 | 10/2013 | Friedrich et al. | |
| 2014/0001857 A1 | 1/2014 | Cservolgyi et al. | |

FOREIGN PATENT DOCUMENTS

| | | | |
|---|---|---|---|
| GB | 2505929 A | | 3/2014 |
| GB | 2533473 A | | 6/2016 |
| WO | 2008/073453 A1 | | 6/2008 |

OTHER PUBLICATIONS

Search Report issued by the UK IPO dated May 29, 2015 in connection UK patent application No. GB1420198.2.
Search Report issued by the UK IPO dated Apr. 19, 2016 in connection UK patent application No. GB1520010.8.

* cited by examiner

METHOD, CONTROLLER, AND NETWORK FOR CONTROLLING DEVICES IN POWER DISTRIBUTION NETWORK

The present application relates to a system and method for controlling devices in a power distribution network.

BACKGROUND TO THE INVENTION

Power distribution networks, such as the UK's National Grid, can supply electricity to millions of homes and businesses. Power distribution networks are typically supplied with electricity by a combination of many different power generation techniques, from many different power stations, spread across large geographical areas.

Power stations supplying a network can generally be divided into two groups: 1) the "core network" of always-on power stations, and 2) the "response network" of power stations which can be turned on, off, or significantly vary their output, to respond to variance in power demand. Nuclear and coal-fired power stations are typical "core network" power stations as they take a considerable time to start and stop. Hydro-electric and gas-fired power stations, which can start generating power within minutes of receiving a request, are typical "response network" power stations.

Demand for power across a network is not constant and is influenced by many different factors. The factors include the time of day, the time of year, the weather and even the timing of national sporting events. Whilst the future demand on a power network can (to a certain extent) be predicted by analysing real time data services such as the Balancing Mechanism Reporting System (BMRS), weather forecasts and predictions from national bodies, unexpected surges in demand are a very common occurrence.

If the power network cannot meet surges in demand, power blackouts can ensue. Additionally, power blackouts can occur if the frequency of the network is too high. The level of demand on the power network effects the speed of rotation of the generators connected to it, and hence the frequency of the electricity across the network. As demand drops, the loads on the generators drop, causing the generators to spin faster and the frequency to increase. If the generators spin too fast they will automatically trip out for their protection, causing power blackouts. Power blackouts can cause significant damage to electrical equipment and can shut down factories with resultant damage to the economy as a whole.

Typically, to meet surges in demand, operators of power distribution networks will issue demand response event notices, such as a "Fast Reserve Despatch" notice. Such event notices generally state at least: the amount of power the distribution network needs adding or removing, the estimated time this power needs to be added or removed, and the required response time. In order to service these requests, significant power generation capability must be kept ready at all times.

Due to the difference in power generation technology response times and longevity, many different power generation technologies must be kept ready. For example, a hydro-electric dam may be able to start generating power within minutes, but the dam can produce power for only a finite time. Whereas, an oil-fired power station may take 20 minutes to start but can generate power indefinitely.

Having large amounts of power generation capacity sitting idle whilst waiting for peaks in demand is both expensive and inefficient. Due to advances in energy storage, there is an increasing pool of devices connected to the power generation network which are capable of providing significant amounts of power. Examples of such devices include electric vehicles (EVs), uninterruptible power supplies (UPSs) and photovoltaic storage banks (PVs).

Since many of these devices are connected both to the power distribution network and the internet (so called "smart devices"), it is possible to remotely control these devices to charge and/or discharge some of their capacity as needed. To make a significant contribution to a large scale power distribution network, the simultaneous use of thousands of devices is required. However, there are considerable difficulties in efficiently using so many devices.

For example, owners of electric vehicles do not mind at what time of the day the vehicle battery is charged, or if a proportion of its battery capacity is discharged, as long as the electric vehicle is ready to use when needed. Typically, electric vehicles across the country are plugged in at a similar time of evening, creating a surge in power demand on the network. If the charging of these devices could be centrally coordinated, the batteries could start charging at staggered times throughout the night, reducing any spike in demand. Furthermore, if an unexpected demand for power occurs on the network, a proportion of the energy stored across the combined electric vehicle fleet could be used to supply the network, meeting the unexpected demand, Similarly, photovoltaic systems can be used to charge banks of batteries for use when the sun is not shining. Owners of PV's may be happy to distribute excess power generation capacity when they are not using it, as long as their needs are met when they need more power.

Typically, prior art power distribution networks maintain information about the state of every device they control, requiring huge amounts of computational processing power to coordinate the devices. As more and more devices are connected to power distribution networks, the rewards for coordinating their use grows greatly, yet the difficulties in monitoring and coordinating them similarly grows.

Therefore, there exists a need for an improved method of controlling these devices. In particular, there is a need for an improved method for co-ordinating smart devices to supply and/or draw power from power distribution networks.

SUMMARY OF THE INVENTION

In accordance with a first aspect, the present invention provides a method of controlling a plurality of power units in a power distribution network (PDN), comprising: a) receiving one or more requests to increase or decrease the power drawn from, or the power supplied to, the PDN; b) determining, based on aggregated power and/or energy data regarding the plurality of power units, and the one or more requests, one or more parameters defining properties of power units to be controlled in response to the one or more requests; c) receiving status updates from the plurality of power units; d) for each status update, determining whether the properties of the power unit fulfils the determined parameters; and e) if the properties of the power unit fulfils the determined parameters, controlling the power unit to change the amount of power drawn from or supplied to the PDN.

In accordance with a second aspect, the present invention provides a method of controlling a plurality of power units in a power distribution network (PDN), comprising: maintaining one or more or more sets of statistical data representing the plurality of power units, wherein the sets of statistical data are updated in response to status updates received from each of the plurality of power units; in response to receiving a request to increase or decrease the power drawn from or supplied to the PDN, determining one or more power unit parameters based on at least one set of statistical data; and in response to receiving status updates from one or more of the plurality of power units, controlling any power units that satisfy the parameters.

In a third aspect, the present invention provides a server arranged to carry out the method described above.

In a fourth aspect, the present invention a fleet controller for controlling a plurality power units in a power distribution network (PDN), the fleet controller arranged to: a) receive one or more requests to increase or decrease the power drawn from, or the power supplied to, the PDN; b) determine, based on aggregated power and/or energy data regarding the plurality of power units, and the one or more requests, one or more parameters defining properties of power units to be controlled in response to the one or more requests; and c) receive status updates from the plurality of power units; d) for each status update, determining whether the properties of the power unit fulfils the determined parameters; and e) if the properties of the power unit fulfil the determined parameters, control the power unit to change the amount of power drawn from or supplied to the PDN.

In a fifth aspect, the present invention provides a fleet controller for controlling a plurality of power units in a power distribution network (PDN), the fleet controller arranged to: maintain one or more or more sets of statistical data representing the plurality of power units, wherein the sets of statistical data are updated in response to status updates received from each of the plurality of power units; in response to receiving a request to increase or decrease the power drawn from or supplied to the PDN, determine one or more power unit parameters based on at least one set of statistical data; and in response to receiving status updates from one or more of the plurality of power units, control any power units that satisfy the parameters.

In a sixth aspect, the present invention provides a power distribution network (PDN), comprising: a plurality of power units, coupled to the PDN, and controllable to increase or decrease the power drawn from the PDN; and a fleet controller as described above, further arranged to receive data messages from and send data messages to the plurality of power units.

In a seventh aspect, the present invention provides a method of controlling power units in a power distribution network (PDN), comprising: receiving status updates from one or more of a plurality of power units, the power units controllable to increase or decrease the amount of power drawn from or supplied to the PDN, the status updates including power and/or energy data regarding the respective power units; generating aggregated power and/or energy data based on status updates received within a first time period; receiving one or more requests to increase or decrease the power drawn from or the power supplied to the PDN; determining, based on the aggregated power and/or energy data, and the one or more requests, one or more parameters defining power units to be controlled in response to the one or more requests; and in response to receiving an update from one or more of the plurality of power units fulfilling the determined parameters, controlling the one or more power units to change the amount of power drawn from or supplied to the PDN.

Further features of embodiments of the invention are defined in the appended claims.

DESCRIPTION OF THE DRAWINGS

The drawings will now be described, by way of example only, and with reference to the accompanying drawings, in which.

DESCRIPTION OF EMBODIMENTS

Figure 1:
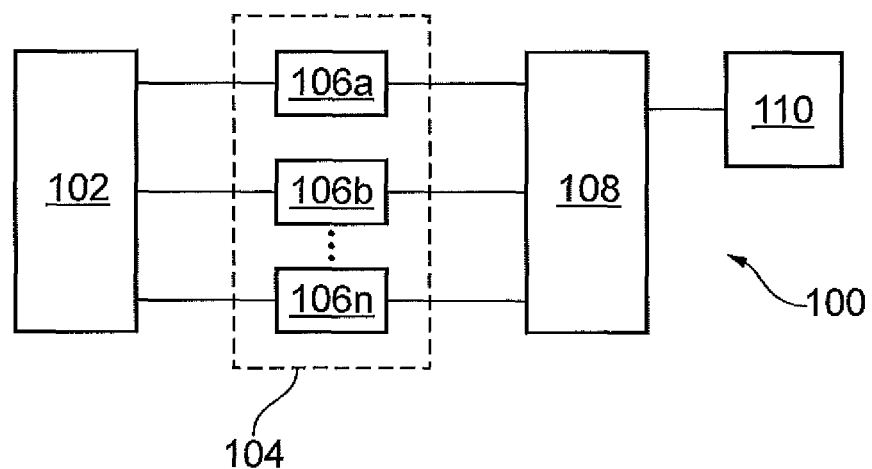
FIG. 1 shows a power distribution network in accordance with a first embodiment of the invention.

A first embodiment of the present invention will now be described with reference to FIG. 1. FIG. 1 shows a power distribution network 100. The power distribution network 100 includes a power grid 102. The power grid 102 is an electricity distribution grid, such as the UK's National Grid. The power distribution network 100 also includes devices which are capable of drawing power from and/or supplying power to the power grid 102. In practice, there may be thousands, if not millions of devices. In the present embodiment, the devices are uninterruptable power supply (UPS)-based devices. These devices may be controllable such that the amount of power drawn from the power grid 102 can be controlled. In addition to this, or in some cases as an alternative, these devices may also be controllable such that the amount of power supplied to the power grid 102 can be controlled. As such, the power distribution network 100 may be controlled to increase or decrease the demand on the power grid 102, or to increase or decrease the amount of power supplied to the power grid 102.

In this embodiment, the collection of devices forming part of the power distribution network 100 is referred to as a fleet. Referring to FIG. 1, the power distribution network 100 includes a fleet of UPS-based devices 104. The fleet of UPS-devices includes UPS-based devices 106a, 106b and 106n. As noted above, the total number of devices may run to thousands or more. However, the precise number is not relevant to the understanding of this embodiment.

The power distribution network 100 includes a fleet controller 108. The fleet controller 108 is arranged to send and receive data from the UPS-based devices in the UPS fleet 104. In FIG. 1, the fleet controller 108 is arranged to communicate with the UPS-based devices 106a, 106b, 106n. The fleet controller 108 is arranged to receive data from and send data to the UPS-based devices 106a, 106b, 106n. The devices include a communications module (not shown) enabling two-way communication with the fleet controller 108. The communications module may use any suitable communications technology, such as a modem or a cellular phone.

Figure 2:
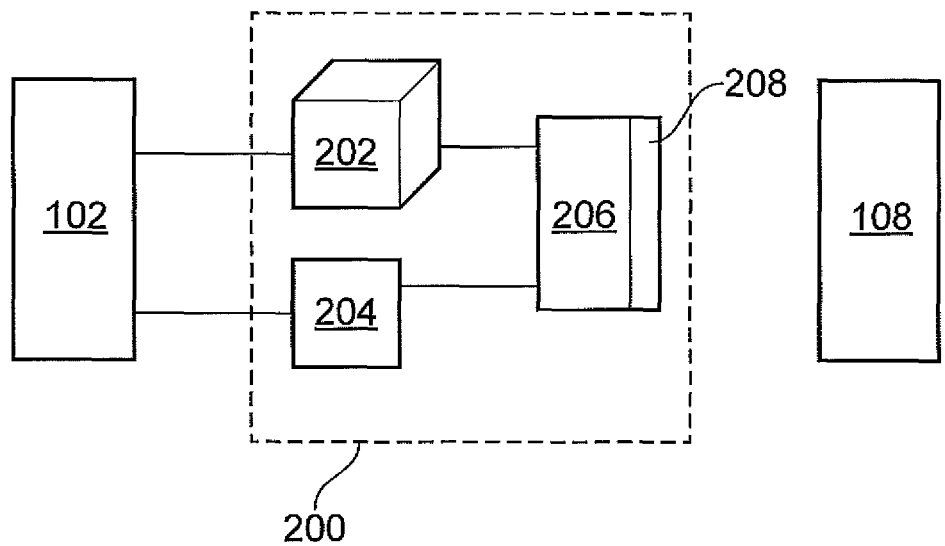
FIG. 2 shows a schematic diagram of a device for use in the power distribution network of FIG. 1.

FIG. 2 shows further details of a UPS-based device 200. This device is the same as the UPS-based devices 106a, 106b, 106n. The device is a collection of components at a particular physical site. For example, the site may be a data centre, a supermarket, a warehouse, or any other industrial, commercial or residential site. The device 200 includes a load 202. The load is the primary energy using element of the site. For example, in a data centre, the load is the power used by the data centre to power its servers and other computers. The device also includes a UPS 204 and a power controller 206. The power controller is connected to the power grid 102, as well as to the load 202 and the UPS 204. In normal use, the power controller 206 powers the load 202 using power from the power grid 102. In the event of a power failure, the load is powered by the UPS 204. This type of operation is known to the person skilled in the art, and will not be described in detail here. When a power failure event is over, the power controller 206 may charge the UPS 204 using power from the power grid 102.

In addition to the above, the UPS-based device 200 may be controlled by the fleet controller 108. The purpose of this is to enable the fleet controller 108 to either reduce or increase the amount of demand on the power grid 102. In order to achieve this, the power controller 206 includes a communications module 208. The communications module enables two-way communication with the fleet controller 108. More details of this mode of operation will be provided below.

The UPS-based device 200 is arranged to transmit regular status updates to the fleet controller 108 via the communications module 208. The period between updates is called the polling interval. This will be described in more detail below. The power controller 206 also includes memory (not shown). The power controller 206 is arranged to store information about the status of the UPS-based device 200 in memory. In particular, the power controller 206 may store the following information:

The device identification number. This is a unique number allocated to the device at set-up;
The type of device. In this case, a UPS-based device;
The rated power the device can deliver to the equipment it is supporting. In the case of a UPS-based device, this is the maximum power that may be taken off the grid 102 by powering the local load from the UPS, rather than the grid;
The actual power the device pulled from the power grid 102 since the last status update. This may not be the full available power, if the load is currently drawing less than the rated power consumption;
The total amount of energy storage capacity (in kWh) allocated to the power distribution network 100. This will be less than the energy capacity of the UPS, as the system will not use all of the energy capacity of every device;
The amount of energy storage capacity (in kWh) available (given battery charge state);
Minutes of battery availability at current power load; and
Device status (i.e. CHARGING, NEUTRAL, DISCHARGING, WITHDRAWN).

For UPS-based devices, the device can be in one of four states. During a demand response event, when the fleet controller 108 requires a UPS-based device 200 to take demand off the grid 102, the device will be in a DISCHARGING state. In other words, the UPS will be powering the local load, thereby taking load of the grid. When a device requires charging (for example following a demand response event), and when there is enough power in the grid 102, the device will be in a CHARGING state. At other times, the device will be in a NEUTRAL state. If the device is unavailable to the power distribution network 100, for example for maintenance, it will be in a WITHDRAWN state.

When a device provides a status update to the fleet controller 108, it sends this status information, as will be described in more detail below. The UPS-based devices 106a, 106b, 106n receive control messages from the fleet controller 108 using PULL-based messaging. In other words, from the perspective of the controller 108, the control messages are being "pulled" into the devices, in response to status updates. An advantage of PULL-based messaging is that it is easier to connect with devices which are behind firewalls; a control message can be sent in response to the status update, and will be allowed pass through the device's firewall.

As noted above, the devices send status updates at regular intervals, referred to as the polling interval. For example, the polling interval may be 60 seconds. In this embodiment, it is assumed that all devices have the same polling interval. However, the devices are not typically synchronised. Accordingly, within a given polling period, the status updates are typically received at different times.

The fleet controller 108 controls the UPS-based devices 106a, 106b, 106n by sending a control message in response to each status update. The fleet controller 108 is arranged to send a control message containing at least:

The device identification number. This is so that the device can check that the control message is intended for it;
The state the device should be in for the next polling period (i.e. charging, neutral, discharging); and
The polling interval.

The fleet controller 108 may adjust the polling interval of the devices 106a, 106b, 106n. By decreasing the polling interval (and therefore increasing the polling frequency), the reactivity of the power distribution network 100 is increased. By increasing the polling interval (and therefore decreasing the polling frequency), the processing burden on the fleet controller 108 is decreased. For the purposes of this embodiment, the polling interval is the same for every device, the polling interval does not change.

The fleet controller 108 uses the information contained in the status updates to construct a statistical overview of all devices in the fleet. These statistical views include information on the overall fleet state. In particular, this may include:

The number of devices which have connected in the last polling interval;
The total rated power and energy capacity of these devices;
The total current available power and energy capacity of these devices;
The number of devices in each of the four device states—charge, discharge, neutral and withdrawn;
The rated power and energy capacity of devices in each of the four device states;
The current power and energy capacity of devices in each of the four device states; and
The amount of load a device, or group of devices, has taken off the grid.

The manner in which this data is collated and utilised will be described in more detail below.

The power distribution network 100 also includes a demand response unit 110. The demand response unit 110 is coupled to the power grid 102 and to the fleet controller 108. The demand response unit 110 is arranged to receive Demand Response Event Notices (DRENs), issued by the operator of the power grid 102. DRENs are requests from the grid for systems, such as the one described here, to reduce or increase demand on the grid. The demand response unit 110 determines, based on a number of factors, whether or not the power distribution network 100 can respond to these requests. The mechanism by which this is done, does not form part of the present invention. However, when the demand response unit 110 identifies a DREN that power distribution network 100 can respond to, it sends a request for an increase or decrease in power consumption to the fleet controller. For example, these instructions could be:

Take 50 MW of demand off the grid;
Put 10 MW of demand onto the grid;
Instruct all devices to charge.

The operation of the power distribution network 100 will now be described in more detail.

Figure 3:
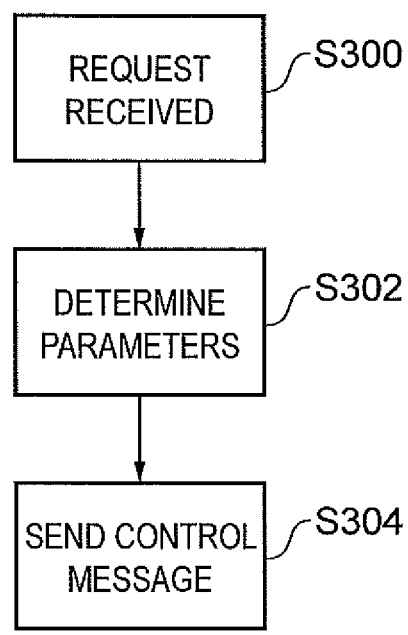
FIG. 3 is a flow-chart showing the operation of the power distribution network shown in FIG. 1.

FIG. 3 is a flow-chart showing the operation of the power distribution network 100. A request to respond to a demand response event is received by the fleet controller 108, from the demand response unit 110 (S300). The fleet controller 108 determines, based on aggregated power and/or energy data, parameters defining which UPS-based devices to control (S302). Importantly, no state-based information about the individual devices is maintained. Because the power distribution network 100 does not maintain a database of state-based (i.e. device specific) information, the fleet controller 108 must instead define parameters that a device must fulfil in order to respond to the demand response event. When a device submits a status update, if it fulfils the parameters, a control message is sent to the device in order to change the amount of power drawn from the network (S304). In the case of a UPS-based device, this might mean powering the load from the UPS (no load on the power grid 102), powering the load from the grid and doing nothing with the UPS (medium load on the power grid 102), or powering the load from the grid and charging the UPS from the grid (high load on the power grid 102).

The manner in which the statistical overview is maintained will now be described in more detail.

For the purposes of this embodiment, the polling interval for all devices is set to 60 seconds. Accordingly, in a given 60 second period, all of the devices will have provided a status update (unless a device is withdrawn or otherwise suffers a problem). Every 60 seconds, the statistical data is zeroed. Each time a status update is received, the fleet controller 108 adds the data to the statistical overview. Accordingly, at the end of the polling interval, the statistical data will provide an accurate overview of all devices that have provided status updates in the previous 60 seconds. Because the individual sets of data from each device are not maintained, at the end of the polling interval, there is no way of knowing which data to remove from the statistical overview, in order to ensure it only relates to the last 60 seconds worth of data; the statistics are purely cumulative. Accordingly, at the end of the polling interval, the statistical data is again zeroed, and the process begins again.

The problem with the aforementioned process is that, it is only possible to update the statistical overview every 60 seconds. During the polling period, only some of the devices have provided status updates, and therefore statistics do not reflect the entire fleet. To get around this problem, the fleet controller 108 maintains 60 sets of data, with each set of data being zeroed 1 second apart. Accordingly, every time a status update is received, 60 sets of statistical data are updated. Each second, one set of data becomes 60 seconds old, and provides an accurate overview of the entire fleet. This set of data is used for any decision making, as will be described in more detail below. That set of data is then zeroed, and the process starts again. The next second, the next set of data becomes 60 seconds old, and that set of data is used to provide an accurate overview of the entire fleet.

In this manner, the statistical data is updated every second. Furthermore, the status updates do not need to be maintained for the purposes of the statistical analysis. There is no need to maintain a database of state-based data on the individual devices.

As noted above, the fleet controller 108 refreshes the statistics every second. The time interval is determined by the required accuracy of the fleet data, and the expected time or nature of demand response event notices. The statistics may be refreshed between once every 0.1 seconds and once every 10 minutes. More typically, the statistics are refreshed between once every second and once every minute. As noted above, for the purposes of this embodiment, the statistics are updated once every second.

The UPS-based devices 106*a*, 106*b*, 106*n* are not typically synchronised. Accordingly, status updates are received at different times. However, assuming the polling interval is the same for all devices, within a given time frame, equivalent to a polling interval, the fleet controller should receive updates from all active devices (for example, some devices may have gone offline).

Figure 4A:
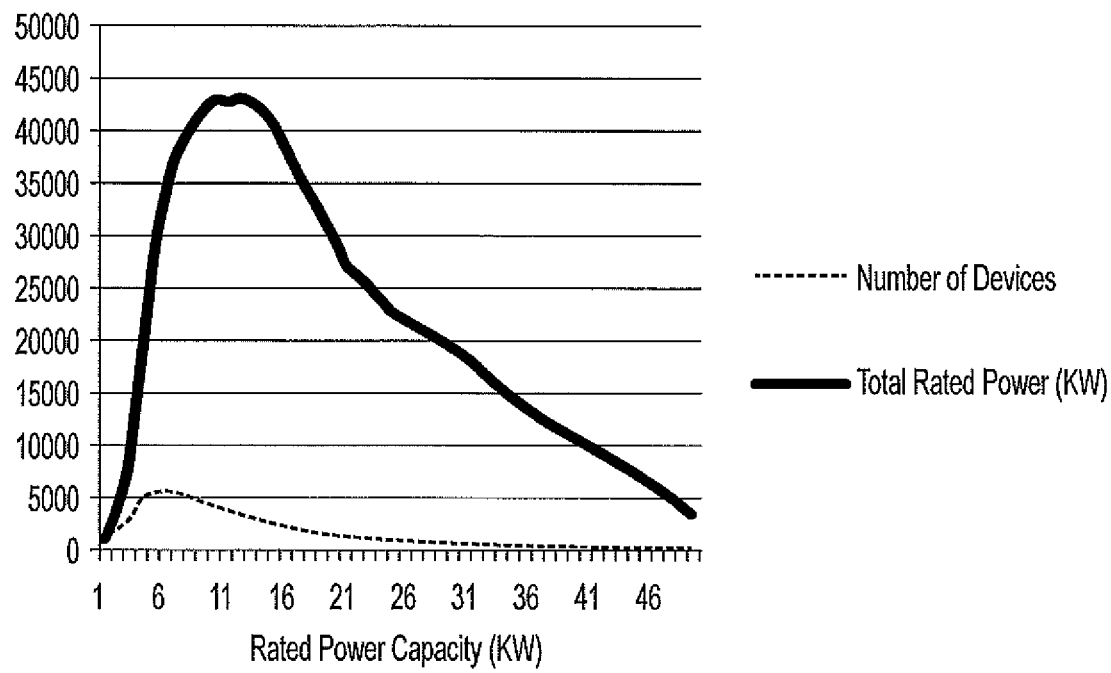
FIG. 4A is a histogram showing rated power capacity.
Figure 4B:
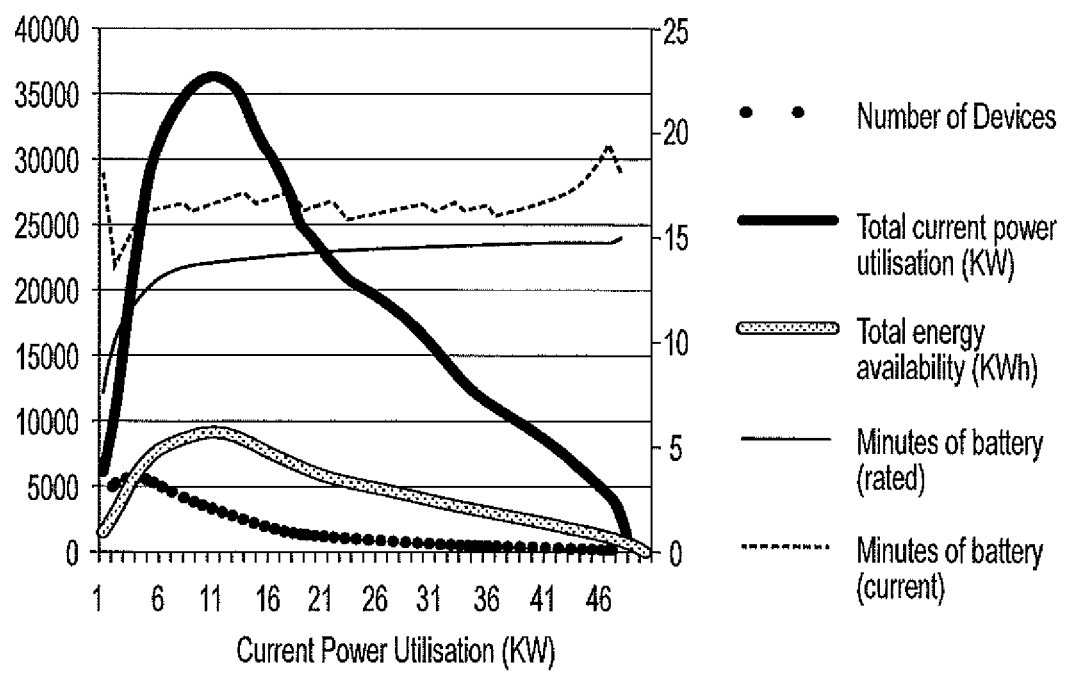
FIG. 4B is a histogram showing current power utilisation.
Figure 4C:
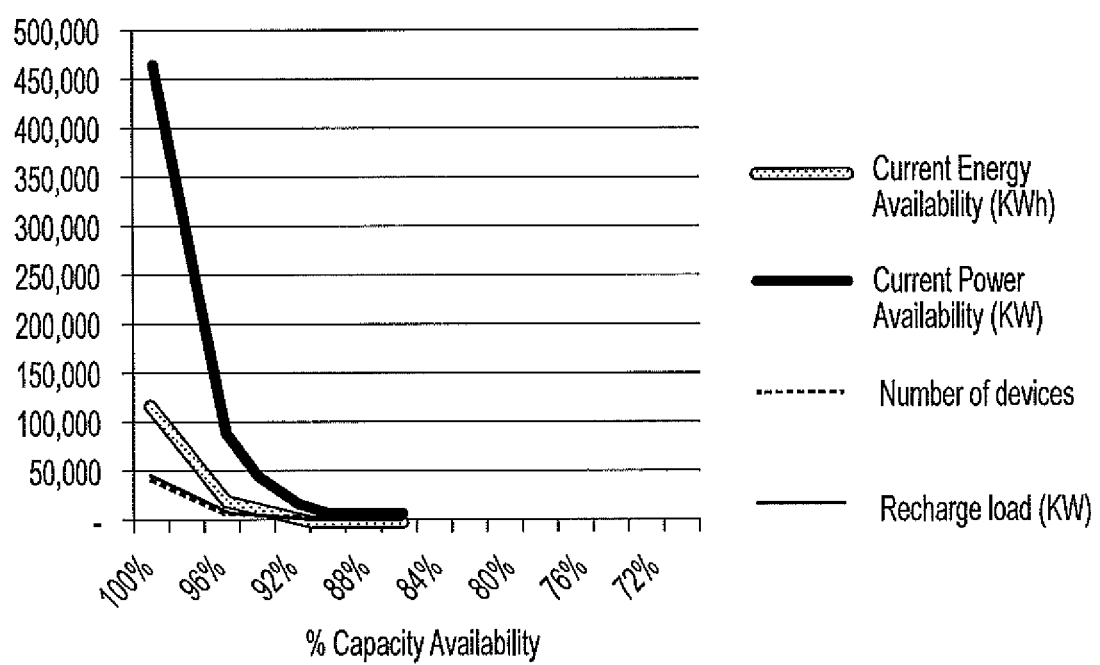
FIG. 4C is a histogram showing percentage capacity availability.

The fleet controller 108 uses the sets of statistics to generate a number of histograms that reflect the statistical data. Some examples of these histograms are shown in FIGS. 4A to 4C. While these histograms do provide a way for a systems administrator to visualise the state of a fleet of devices, they are also used by the fleet controller 108 in determining how to respond to a demand response event. As with the sets of statistics, the fleet controller 108 updates 60 sets of histograms every time a status update is received. The histograms that are 60 seconds old, are used for any necessary decision making, before being zeroed.

FIG. 4A is a histogram showing:
Rated Power Capacity: the number of devices and the total rated power capacity of these devices, plotted against the rated power capacity of the device.

FIG. 4B is a histogram showing:
Current Power Utilisation: the number of devices and the total current power utilisation of these devices, plotted against the current power utilisation of the device;
Current Energy Available: the total amount of energy (kWh) available, plotted against the current power utilisation of the device;
Minutes of Battery (Rated): the total number of minutes of battery capacity available at each device's rated power utilisation, plotted against the rated power utilisation of the device; and
Minutes of Battery (Current): the total number of minutes of battery capacity available at each device's current power utilisation, plotted against the current power utilisation of the device.

FIG. 4C is a histogram showing:
Current Energy vs Capacity Available: the total amount of energy (kWh) currently available, plotted against the percentage capacity availability of the device;
Current Power vs Capacity Available: the total current power utilisation of the devices available, plotted against the percentage capacity availability of the device;
Current Devices vs Capacity Availability: the total number of devices available, plotted against the percentage capacity availability of the device; and
Recharge Load vs Capacity Availability: the total power that would be used to recharge batteries if the device were placed into the Charge state, plotted against the percentage capacity availability of the device.

The percentage capacity availability is the amount of energy (kWh) currently available to the power distribution network 100 from a device's energy storage unit, divided by the total amount of energy (kWh) this device has allocated to the power distribution network, and multiplied by 100%. For example, when a device's energy store is fully charged, it will have 100% capacity availability. This will drop as it operates in DISCHARGE state, reaching 0% when all the energy capacity allocated to the power distribution network has been used. A device may choose to allocate only a proportion of its energy storage capacity to the power distribution network. For example, a battery-based UPS will typically allocate no more than 20% of its capacity to the power distribution network, retaining the balance of its capacity for its primary function.

The manner in which the power distribution network 100 responds to demand response events will now be described. As noted above, demand response events may take the form of requests to vary the demand on the power grid 102, or requests to vary the supply to the grid 102. In this embodiment, we will describe demand response events that require the demand placed on the grid 102 to be varied.

Figure 5:
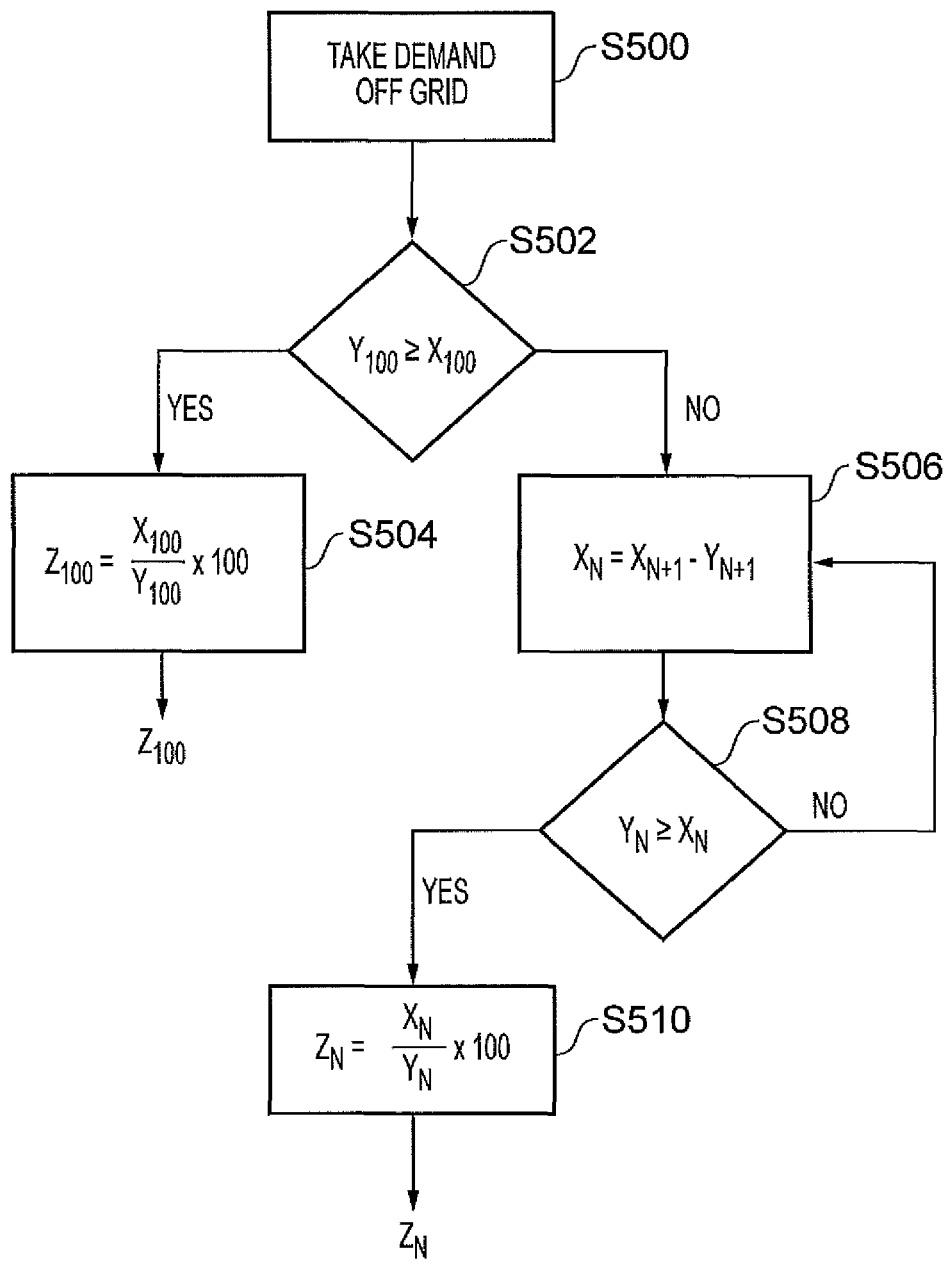
FIG. 5 is a further flow-chart showing the operation of the power distribution network shown in FIG. 1.

FIG. 5 is a flow-chart showing the operation of the power distribution network 100 when a request to take demand off the grid is received by the fleet controller 108 from the demand response unit 110. The fleet controller 108 receives a request to take XT kW of demand off the power grid 102 (S500). In an ideal situation, the power distribution network would only be required to use UPS-based devices whose batteries are at 100% of capacity. However, in some cases, there may not be enough devices with 100% capacity to satisfy the current request. Accordingly, the first step is for the fleet controller 108 to determine whether the total power utilisation of devices with 100% of their capacity available ($Y_{100}$), is more than or equal to $X_{100}$ kW (S502). $X_{100}$ is the amount of power requested from the devices at 100% capacity. $X_{100}$ is therefore equal to XT. If the answer is yes, then the power distribution network 100 can meet the request using devices that are at 100% capacity. The fleet controller 108 then determines what percentage of devices need to be discharged (S504). This is determined by the equation [1]:

$$Z_{100} = \frac{X_{100}}{Y_{100}} * 100 \qquad [1]$$

where $X_{100}$ is the amount of power that needs taking off the grid in kW (equal to XT), $Y_{100}$ is the total power utilisation of devices that have 100% capacity, and $Z_{100}$ is the percentage of devices that have 100% capacity that need to be discharged in this polling interval. For example, if the fleet controller 108 receives a request to remove 50 kW ($X_{100}$) of load from the power grid 102, and the total power capacity available amongst the UPS-based devices 106a, 106b, 106n having 100% capacity is 100 kW ($Y_{100}$), then only 50% ($Z_{100}$) of the UPS-devices need to be put into the discharge state, in order to satisfy the demand request.

Returning to step S502, if $Y_{100}$ is less than $X_{100}$, then the power distribution network 100 can not meet the request using devices that are at 100% capacity. Accordingly, it must next determine whether there are enough devices at 99% capacity to satisfy the request (when combined with those devices at 100%). The fleet controller 108 next determines how much power must be provided by devices at 99% ($X_N$, where N=the percentage capacity of the devices) (S506). This is determined by the following equation:

$$X_N = X_{N+1} - Y_{N+1} \qquad [2]$$

where $X_{N+1}$ is the power demanded and $Y_{N+1}$ is the total power utilisation of the devices with (N+1)% capacity. In this case, N=99.

The fleet controller 108 determines if $Y_N$ is greater or equal to $X_N$ (S508). In other words, the fleet controller 108 determines if the total power capacity of devices having a capacity of 99% is greater or equal to the power required by devices at 99%. If the answer is yes, then the power distribution network 100 can meet the request using devices that are at 99% capacity (combined with those at 100% capacity). The fleet controller 108 then determines what percentage of devices need to be discharged (S510). This is determined by the equation [3]:

$$Z_N = \frac{X_N}{Y_N} * 100 \qquad [3]$$

where $X_N$ is the amount of power that needs taking off the grid by N % capacity devices (in this case N=99), $Y_N$ is the total power utilisation of devices that have N % capacity, and $Z_N$ is the percentage of devices that have N % capacity that need to be discharged in this polling interval. For example, if $X_{99}$ is 25 kW, and the total power utilisation available amongst the UPS-based devices 106a, 106b, 106n having 99% capacity is 75 kW ($Y_{99}$), then only 33.3% ($Z_{99}$) of the UPS-devices need to put into the discharge state, in order to satisfy the demand request.

Returning to step 508, if $Y_N$ is less than $X_N$, then the power distribution network 100 can not meet the request using devices that are at N % capacity (in this case N=99). Accordingly, it must next determine whether there are enough devices at 98% capacity to satisfy the request (when combined with those devices at 100% and 99%). The fleet controller 108 next determines how much power must be provided by devices at 98% ($X_N$, where N=the percentage capacity of the devices) by returning to step S506. This process continues, for a given demand response event, until it is determined what percentage of which devices (in capacity terms) are required to fulfil the particular request.

The fleet controller then defines parameters for the UPS-based devices it wishes to control. In this example, the only parameters defined by the fleet controller 108 are the percentage capacity of devices required to satisfy the current demand response event, and the percentage of devices required of a given capacity. However, other parameters may be used. For example, another parameter that may be used is battery degradation. When deciding which devices to turn on, the fleet controller could factor in the state of the battery, from a quality perspective (number of charge cycles, for example).

The following tables give some example parameters. Firstly, where the event can be met by using all 100% capacity devices, and 50% of 99% capacity devices:

| Device Capacity (%) | Percentage of Devices (%) |
| --- | --- |
| 100 | 100 |
| 99 | 50 |

Secondly, where the event can be met by using 50% of 100% capacity devices:

| Device Capacity (%) | Percentage of Devices (%) |
| --- | --- |
| 100 | 50 |

As soon as parameters have been determined, the fleet controller 108 starts monitoring status updates from UPS-based devices 106a, 106b, 106n. When a device provides a status update, if the device fulfils the parameters, the fleet controller 108 responds with a control message. As noted above, a UPS-based device can be put into three main states:

Charge—the UPS is charging and the load takes power from the grid;

Neutral—the UPS is neither charging nor supplying the load, and the load takes power from the grid; and Discharging—the UPS is supplying power to the load, and no power is taken from the grid.

In addition, the device can be withdrawn, if it is not able to respond to commands. In the present example, the control message is to DISCHARGE, thereby removing demand from the power grid 102.

Those devices that do not fulfil the determined parameters are instructed as follows:

If their current status is discharge, they are put into neutral—these are devices which were used in the previous polling period, but have now discharged to the point where other devices are to be used instead. The advantage of this is that all devices under control are kept at a similar charge level;

If their current status is neutral, they remain in neutral; and

If their current status is charge, they remain in charge.

As described above, the network 100 may use the percentage of capacity as the parameter that defines which devices are to be controlled. However, in practice, devices have different amounts of energy available. Accordingly, after a device has been discharged for one polling interval, the percentage of capacity available may differ. For example, if a device is able to supply 10 kW for 10 minutes, then after one minute (a single polling interval) the device will be at 90% capacity. However, if a device is able to supply 10 kW of power for 100 minutes, then after one minute the device will be at 99% capacity. In order to take account of this, another way to prioritise which devices to use, is to use so called priority chunks. When a battery is it 100% capacity, it is assigned a priority of 100. At priority 100, the battery is able to offer a chunk of energy, say 10 kWmin for example. After this time period, the battery may be at 90% capacity, and is assigned a priority of 90, and so on. In this example, the battery is able to offer 10 chunks of 10 kWmin. However, much of the time, the device will only be used when at priority 100. When it is at a lower priority, it is less likely to be used, and the fleet controllers will be looking for devices that are at priority 100 first.

Figure 6A:
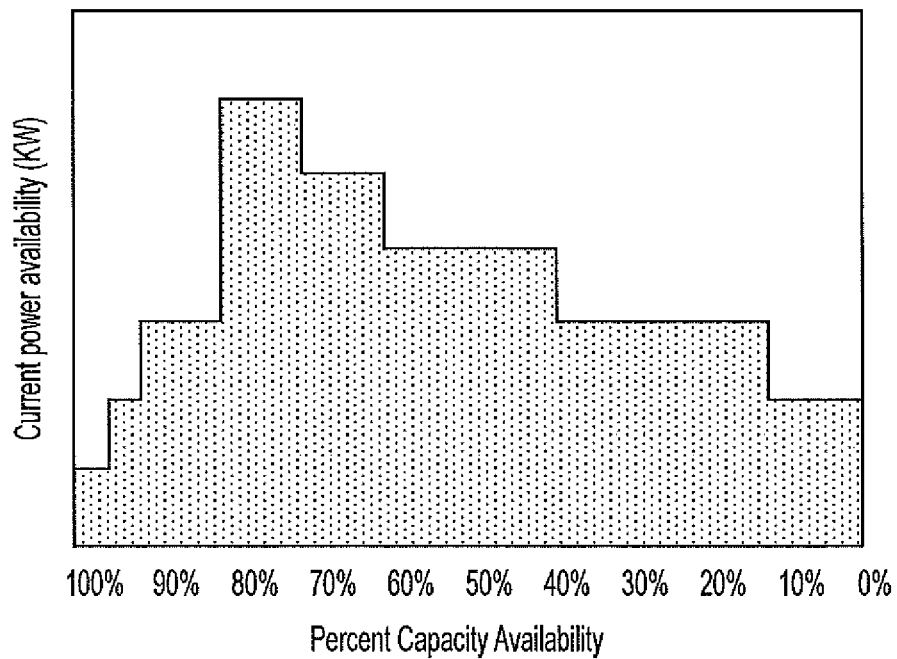
FIG. 6A is a histogram showing current power availability.
Figure 6B:
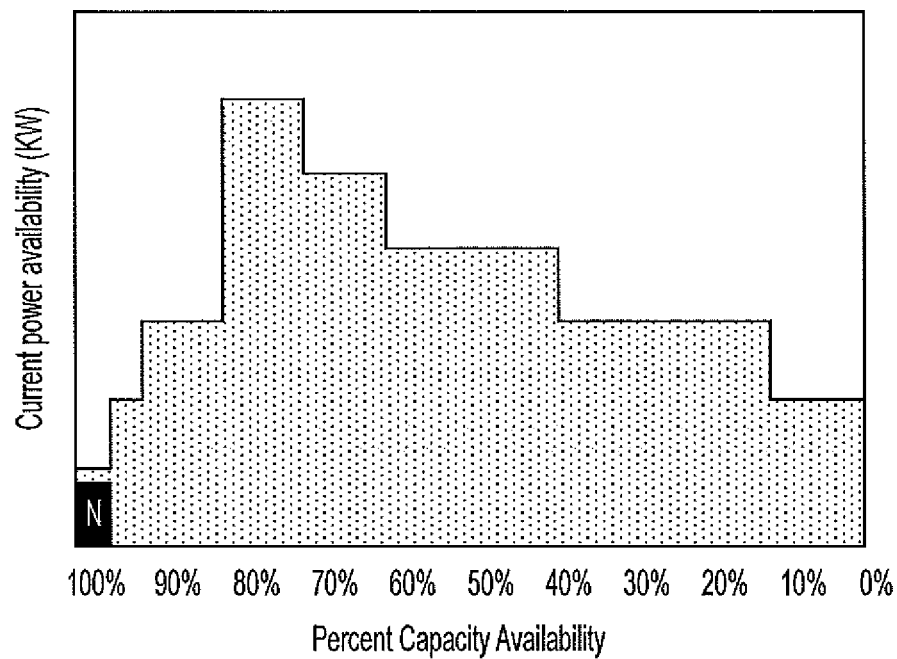
FIG. 6B is a histogram showing current power availability.
Figure 6C:
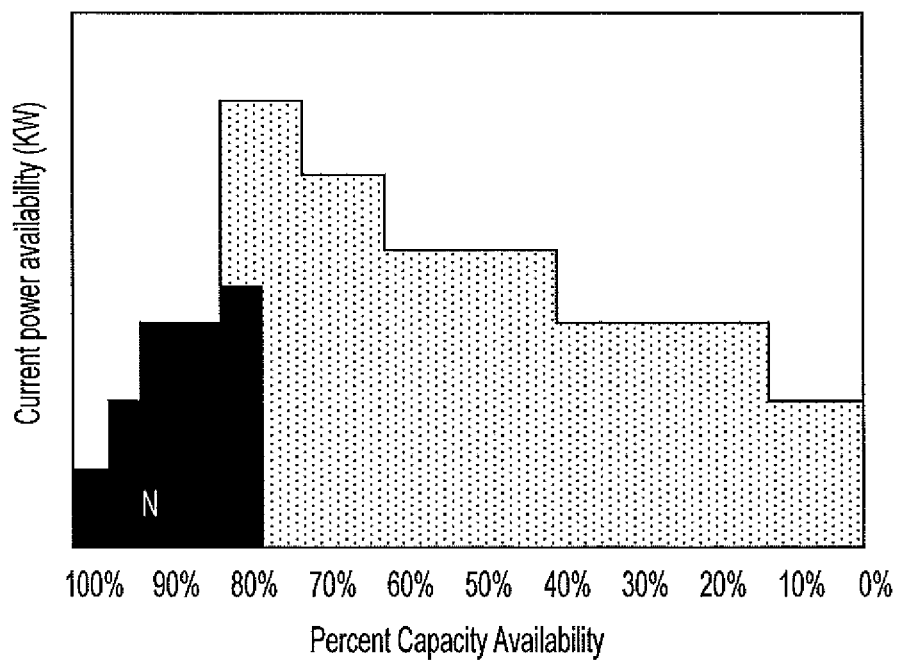
FIG. 6C is a histogram showing current power availability.

FIGS. 6A to 6C are histograms which show current power availability versus percentage capacity availability in a particular polling interval. As the histograms show, there is more power available amongst devices that are 80% charged than for any other devices. FIG. 6B shows a histogram in which the amount of demand (N), can be satisfied by devices at 100% capacity. FIG. 6C shows a histogram in which the amount of demand (N), can be satisfied by all devices over 80% capacity, and around 50% of devices at 80% capacity. As can be seen, the area under the graph can be used to determine which devices are required to fulfil a particular demand response event.

Figure 7:
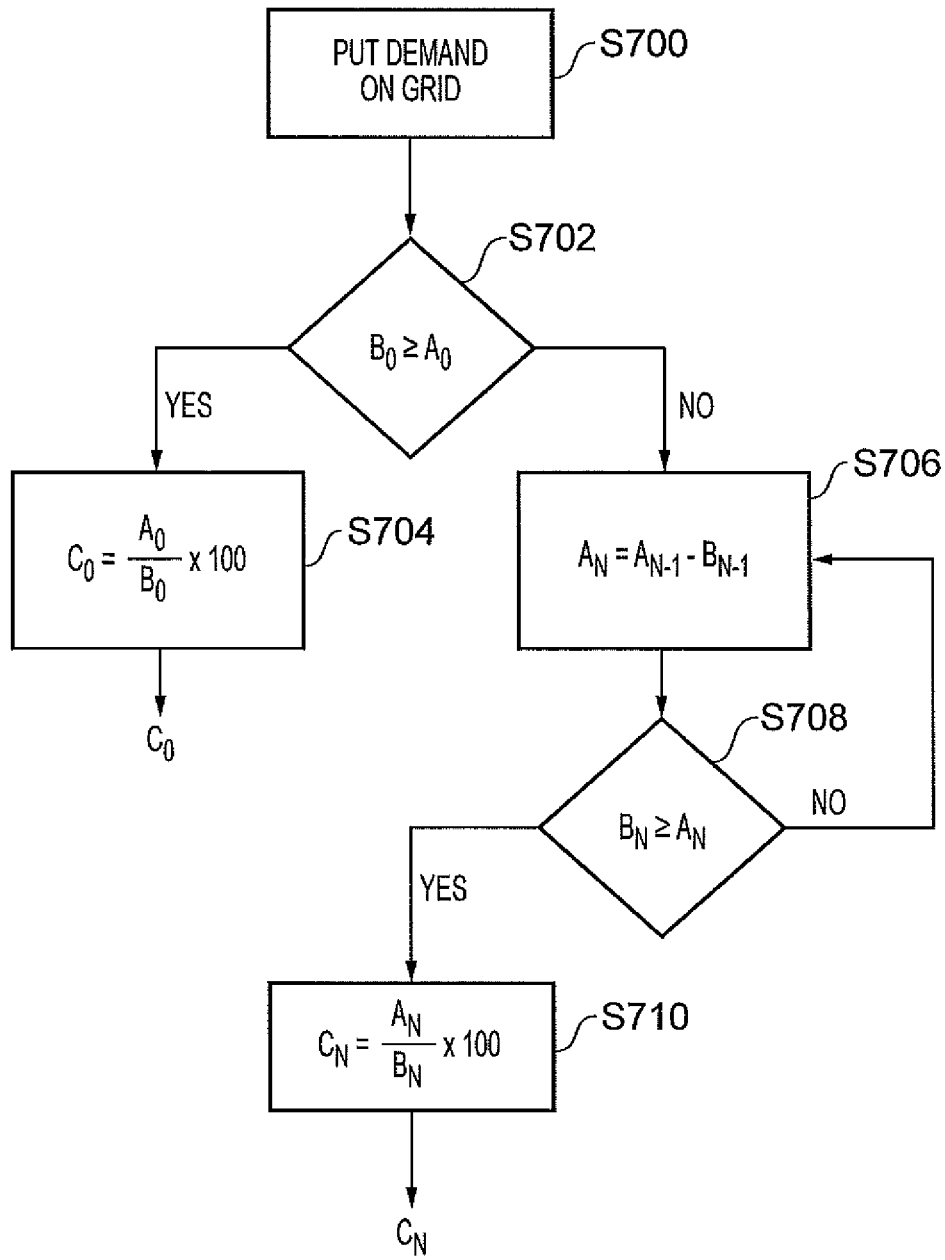
FIG. 7 is a further flow-chart showing the operation of the power distribution network shown in FIG. 1.

FIG. 7 is a flow-chart showing the operation of the power distribution network 100 when a request to put demand on to the grid is received by the fleet controller 108 from the demand response unit 110. Such a request may be in response to a frequency response request from the grid. Such a request is issued when the frequency of the grid is too high, and demand is required to bring it down. In addition, the demand response unit 110 monitors the grid to determine times of low demand in order to determine when to recharge the UPS batteries. The demand response unit 110 will also issue a request to put demand on the grid, in order to charge the batteries at a suitable time. The manner in which the fleet controller 108 decides which devices to charge, is in some ways similar to deciding which devices to discharge. However, rather than using devices that are at 100% capacity, the devices looks for devices that are at 0% capacity first.

The fleet controller 108 receives a request to put $A_T$ kW of demand onto the power grid 102 (S700). In an ideal situation, the power distribution network 100 would be able to recharge all batteries that are not at 100% of capacity. However, it may often be the case that only some devices may be recharged. Accordingly, the first step is for the fleet controller 108 to determine whether the total recharge load of devices with 0% of their capacity available ($B_0$), is greater than or equal to $A_0$ kW (S702). $A_0$ is the amount of power required to charge devices at 0% capacity. $A_0$ is therefore equal to $A_T$. If the answer is yes, then the power distribution network 100 can meet the request using devices that are at 0% capacity. The fleet controller 108 then determines what percentage of devices need to be charged (S704). This is determined by the equation [1]:

$$C_0 = \frac{A_0}{B_0} * 100 \qquad [4]$$

where $A_0$ is the amount of power that needs drawing from the grid in kW (equal to $A_T$), $B_0$ is the recharge load of devices that have 0% capacity, and $C_0$ is the percentage of devices that have 0% capacity that need to be charged in this polling interval. For example, if the fleet controller 108 receives a request to put 50 kW ($A_0$) of load onto the power grid 102, and the total recharge load available of UPS-based devices 106a, 106b, 106n having 0% capacity is 100 kW ($B_0$), then only 50% ($C_0$) of the UPS-devices need to put into the charge state, in order to satisfy the request.

Returning to step S702, if $B_0$ is less than $A_0$, then the power distribution network 100 can not meet the request using devices that are at 0% capacity. Accordingly, it must next determine whether there are enough devices at 1% capacity to satisfy the request (when combined with those devices at 0%). The fleet controller 108 next determines how much load must be provided by devices at 1% ($A_N$, where N=the percentage capacity of the devices) (S706). This is determined by the following equation:

$$A_N = A_{N-1} - B_{N-1} \qquad [5]$$

where $A_{N-1}$ is the power demanded and $B_{N-1}$ is the total recharge load of the devices with (N−1)% capacity. In this case, N=1.

The fleet controller 108 determines if $B_N$ is greater or equal to $A_N$ (S708). In other words, the fleet controller 108 determines if the total recharge load of devices having a capacity of 1% is greater or equal to the power required by devices at 1%. If the answer is yes, then the power distribution network 100 can meet the request using devices that are at 1% capacity (combined with those at 0% capacity). The fleet controller 108 then determines what percentage of devices need to be charged (S710). This is determined by the equation [6]:

$$C_N = \frac{A_N}{B_N} * 100 \qquad [6]$$

where $A_N$ is the amount of power that needs putting on the grid by N % capacity devices (in this case N=1), $B_N$ is the total recharge load of devices that have N % capacity, and $C_N$ is the percentage of devices that have N % capacity that need to be charged in this polling interval. For example, if Ai is 25 kW, and the total recharge load of UPS-based devices 106a, 106b, 106n having 1% capacity is 75 kW ($B_1$), then only 33.3% ($C_1$) of the UPS-devices need to put into the charge state, in order to satisfy the demand request.

Returning to step S708, if $B_N$ is less than $A_N$, then the power distribution network 100 can not meet the request using devices that are at N % capacity (in this case N=1).

Accordingly, it must next determine whether there are enough devices at 2% capacity to satisfy the request (when combined with those devices at 0% and 1%). The fleet controller 108 next determines how much power must be provided by devices at 2% ($X_N$, where N=the percentage capacity of the devices) by returning to step S706. This process continues, for a given demand response event, until it is determined what percentage of which devices (in capacity terms) are required to fulfil the particular request.

The fleet controller then defines parameters for the UPS-based devices it wishes to control. In this example, the only parameters defined by the fleet controller 108 are the percentage capacity of devices required to satisfy the current demand response event, and the percentage of devices required of a given capacity.

The following tables give some example parameters. Firstly, where the event can be met by using all 0% capacity devices, and 50% of 1% capacity devices:

| Device Capacity (%) | Percentage of Devices (%) |
|---|---|
| 0 | 100 |
| 1 | 50 |

Secondly, where the event can be met by using 50% of 100% capacity devices:

| Device Capacity (%) | Percentage of Devices (%) |
|---|---|
| 0 | 50 |

As soon as parameters have been determined, the fleet controller 108 starts monitoring status updates from UPS-based devices 106a, 106b, 106n. When a device provides a status update, if the device fulfils the parameters, the fleet controller 108 responds with a control message. As noted above, a UPS-based device can be put into three main states:

Charge—the UPS is charging and the load takes power from the grid;
Neutral—the UPS is neither charging nor supplying the load, and the load takes power from the grid; and
Discharging—the UPS is supplying power to the load, and no power is taken from the grid.

In addition, the device can be withdrawn, if it is not able to respond to commands. In the present example, the control message is to CHARGE, thereby putting demand onto the power grid 102.

Those devices that do not fulfil the parameters chosen at are instructed as follows:

If their current status is charge, they are put into neutral—these are devices which were used in the previous polling period, but have now charged to the point where other devices are to be used instead. The advantage of this is that all devices under control are kept at a similar charge level;
If their current status is neutral, they remain in neutral; and
If their current status is discharge, they remain in discharge.

In the above-described embodiment, the power distribution network 100 includes a single fleet controller 108. In a further embodiment, the network may include more than one fleet controller. Each fleet controller has a limit to the number of devices it may handle. Accordingly, by using multiple fleet controllers, the total number of devices that may be handled is increased. There is no mapping of devices to particular fleet controllers. Instead, every fleet controller may handle every device. When a device connects, it is routed to a particular fleet controller using a load balancing algorithm. The load balancing algorithm is not the subject of the present invention. Load balancing algorithms used in a conventional web request context may be used for this purpose; such as Amazon's Elastic Load Balancing. It may be the case that a device connects to the same fleet controller for more than one status update. However, equally, if the load balancing algorithm requires it, a device may connect to different fleet controllers. Because the system is stateless, and because the fleet controllers keep no record of the devices that have connected to them, the fleet controllers do not need to know whether a device has connected to it previously.

One of the advantages of using multiple fleet controllers is that redundancy is introduced into the system. If a particular controller fails or is overloaded, other controllers can pick up its devices. An advantage of having no mapping is that it is easy to add or remove controllers.

As noted in connection with the first embodiment, it is possible for the controllers to increase or decrease the polling interval of each device. In the context of using multiple fleet controllers, by increasing the polling interval, and reducing the burden on the controllers, the number fleet controllers may be reduced during operation. A benefit of this is that operating costs would be reduced. This could be done when the system knows that there are low levels of demand response events. By not mapping fleet controllers to particular devices, the system is very flexible.

When using multiple fleet controllers, each fleet controller only builds up a statistical picture of the devices that connect to it. However, the number of devices connecting to each fleet controller is large enough that the statistical overview should also reflect the overall fleet.

One of the advantages of the above described embodiments, is that it is not necessary to retain information about the devices in the fleet. In other words, the system is stateless. This is because the network 100 uses the statistical overview of a fleet to determine how to respond to demand response events. In prior art systems, a list of devices is required, partly in order to be able to know where to send control messages. The network 100 uses PULL-based messaging, so that control signals are sent in response to status messages. By implementing a messaging protocol that requires the devices to send regular status updates, the network knows that it will be able to send control signals on a regular basis. By not storing device information, the storage and processing burden placed on the fleet controllers is reduced. Furthermore, being stateless means that the fleet controllers can be flexible in how they connect to, and receive signals from, devices in the fleet.

Another advantage of the above-described embodiments, is the degree of flexibility in the system, compared with prior art systems. Because decisions about controlling devices are only ever made for a single polling interval, the system can be very flexible in terms of how demand response events are responded to, even during an event. For example, an event that last for 15 minutes, may be served by different devices, for each 1 minute polling interval. In the prior art, devices are generally controlled for much longer periods of time, with particular devices being required to service an entire event. This leads to devices being overused, which is not good for the device owners. By using central aggregation, and short control time periods, the system is better able to spread requests, and react to different demands.

In one or more of the aforementioned embodiments, the devices and fleet controllers may communicate using a standard such as OpenADR (Open Automated Demand Response).

In the above described embodiments, the network uses power availability and energy capacity in order to determine the best response to a particular event. However, the network may also use frequency, voltage and/or phase, in order to further improve the manner in which devices are prioritised.

The devices may also sorted into device pools. Devices capable of being used to deliver a particular demand response service, such as "Fast Reserve Response", "Short Term Operating Reserve" or "Firm Frequency Response", are arranged together in device pools. Demand response services are characterised by the amount of power to be added or removed from the power distribution network, the length of time the power change is required and/or the how quick the power change must be implemented. Each pool may contain devices from several different technologies. Any particular device may belong to several different pools.

As noted above, the power distribution network 100 may include devices other than UPS-based devices. In particular, the devices may also include electric vehicles (EVs) and photovoltaic storage banks (PVs). If a fleet of devices includes more than one type of device, the fleet is notionally divided into a number of sub-fleets. Each sub-fleet includes devices having similar technologies. Hence, there may be an electric vehicles (EVs) sub-fleet, an uninterruptible power supplies (UPSs) sub-fleet, a photovoltaic storage banks (PVs) sub-fleet, and so on.

All of the devices noted above include battery storage. In terms of control, the fleet controllers are typically charging or discharging the batteries. However, the network may also control devices that use other energy storage technologies. For example, the network could be connected to UPSs that store energy in flywheels, or to devices that include thermal energy stores. The network may also control devices that do not include batteries. For example, the network could be connected to heating units, such as heat pumps, or refrigerators. These units place demand on the power grid, when in use, and could be controlled in order to reduce the amount demand on the grid, in a similar way to UPSs, EVs and PVs.

In the above-described embodiments, the fleet controllers and the demand response unit have been described as separate entities. However, these components may be run as virtual instances, and may all run on a single server. However, by distributing these components across a computer network, the system has the advantage of improved redundancy.

The invention claimed is:

1. A method of controlling a plurality of power units in a power distribution network (PDN), comprising:
    a) receiving one or more requests to increase or decrease the power drawn from, or the power supplied to, the PDN;
    b) determining, based on aggregated power and/or energy data regarding the plurality of power units, and the one or more requests, one or more parameters defining properties of power units to be controlled in response to the one or more requests;
    c) receiving status updates from the plurality of power units, each status update comprising information about the properties of the power unit that sent the status update; and for each status update determining, based on the received information and the determined parameters, whether the properties of the power unit that sent the status update fulfil the determined parameters; and if the properties of the power unit fulfil the determined parameters, controlling the power unit that sent the status update to change the amount of power drawn from or supplied to the PDN.

2. A method according to claim 1, further comprising: updating the aggregated power and/or energy data with each status update.

3. A method according to claim 1, wherein the aggregated power and/or energy data is statistical data based on status updates received from the plurality of power units.

4. A method according to claim 3, wherein the statistical data is based on status updates received in a first time period.

5. A method according to claim 4, further comprising generating a plurality of sets of statistical data, each set based on a time period offset from other sets of statistical data.

6. A method according to claim 5, wherein step b) is based on a set of statistical data for which the first time period is complete.

7. A method according to claim 1, wherein each power unit comprises a load, and the step of controlling one or more power unit includes controlling the amount of power drawn from the PDN by the load.

8. A method according to claim 7, wherein each power unit further comprises one or more energy storage units arranged to supply power to the respective load, or draw power from the PDN.

9. A method according to claim 8, wherein the request is a request to decrease the power drawn from the PDN, and the step of controlling includes controlling the one or more energy storage units to supply power to the load to reduce the power drawn from the PDN.

10. A method according to claim 9, wherein the request is a request to increase the power drawn from the PDN, and the step of controlling includes controlling the one or more energy storage units draw power from the PDN, to increase the power drawn from the PDN.

11. A method according to claim 8, wherein said energy storage units are batteries, and said step of controlling includes instructing the batteries to discharge or charge.

12. A method according to claim 8, further comprising receiving status updates from the plurality of power units, the status updates including power and/or energy data regarding the respective power units.

13. A method according to claim 12, wherein the status updates include the current energy capacity of said one or more energy storage units, and said one or more parameters include the current energy storage capacity of the one or more energy storage units.

14. A method according to claim 13, further comprising generating said aggregated power and/or energy data based on status updates received within a first time period.

15. A method according to claim 14, further comprising generating a plurality of sets of aggregated power and/or energy data, each set of data based on status updates received in time period equivalent in length to the first time period, but offset by a second time period.

16. A method according to claim 1, wherein the status updates are sent by each power unit at predetermined time intervals, and the predetermined intervals may be changed.

17. A method according to claim 1, wherein said PDN includes one or more fleet controllers, and the steps of receiving, determining and controlling are carried out by said one or more fleet controllers.

18. A method according to claim 1, wherein the determination of whether the properties of the power units fulfil the determined parameters is made by the respective power units.

19. A method of controlling a plurality of power units in a power distribution network (PDN), comprising: maintaining one or more or more sets of statistical data representing the plurality of power units, wherein the sets of statistical data are updated in response to status updates received from each of the plurality of power units; in response to receiving a request to increase or decrease the power drawn from or supplied to the PDN, determining one or more power unit parameters based on at least one set of statistical data; and in response to receiving status updates from one or more of the plurality of power units, controlling any power unit whose status update satisfies the determined parameters, wherein each status update comprises information about the properties of the power unit that sent the status update, and wherein the power units are controlled based on the information in their status update satisfying the determined parameters.

20. A fleet controller for controlling a plurality power units in a power distribution network (PDN), the fleet controller arranged to:
a) receive one or more requests to increase or decrease the power drawn from, or the power supplied to, the PDN;
b) determine, based on aggregated power and/or energy data regarding the plurality of power units, and the one or more requests, one or more parameters defining properties of power units to be controlled in response to the one or more requests; and
c) receive status updates from the plurality of power units, each status update comprising information about the properties of the power unit that sent the status update; and for each status update determining, based on the received information and the determined parameters, whether the properties of the power unit that sent the status update fulfil the determined parameters; and if the properties of the power unit fulfil the determined parameters, control the power unit that sent the status update to change the amount of power drawn from or supplied to the PDN.

* * * * *